United States Patent
Kurian et al.

(10) Patent No.: US 11,620,137 B2
(45) Date of Patent: Apr. 4, 2023

(54) AUTONOMOUS SERVER PROTECTION SYSTEM

(71) Applicant: Microsoft Technology Licensing, LLC, Redmond, WA (US)

(72) Inventors: Alphonse Kurian, Bellevue, WA (US); Chandrasekhar Pasupuleti, Issaquah, WA (US); Arpan Kumar Asthana, Bothell, WA (US); Anatoliy Panasyuk, Bellevue, WA (US); Monika Machado Santacruz, Sammamish, WA (US); PushpRaj Agrawal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 30 days.

(21) Appl. No.: 16/929,041

(22) Filed: Jul. 14, 2020

(65) Prior Publication Data

US 2022/0019445 A1 Jan. 20, 2022

(51) Int. Cl.
*G06F 9/44* (2018.01)
*G06F 1/32* (2019.01)
*G06F 9/4401* (2018.01)
*G06F 1/3209* (2019.01)

(52) U.S. Cl.
CPC .......... *G06F 9/4418* (2013.01); *G06F 1/3209* (2013.01); *G06F 9/442* (2013.01)

(58) Field of Classification Search
CPC ...... G06F 9/4418; G06F 9/442; G06F 1/3209; H04L 63/20
See application file for complete search history.

(56) References Cited

U.S. PATENT DOCUMENTS

| | | | |
|---|---|---|---|
| 6,724,731 B1 | 4/2004 | Shibasaki et al. | |
| 8,204,990 B1* | 6/2012 | Avery | H04L 12/4625 709/224 |
| 10,341,377 B1* | 7/2019 | Dell'Amico | G06N 20/20 |
| 10,749,885 B1* | 8/2020 | Hoorvitch | H04L 63/08 |
| 2010/0306544 A1* | 12/2010 | Lionetti | H04L 9/083 380/278 |
| 2014/0297054 A1 | 10/2014 | Tsai | |

OTHER PUBLICATIONS

"International Search Report and Written Opinion Issued in PCT Application No. PCT/US21/029039", dated Jul. 14, 2021, 10 Pages.

* cited by examiner

*Primary Examiner* — Stefan Stoynov
(74) *Attorney, Agent, or Firm* — Ray Quinney & Nebeker; Christopher K. Hallstrom

(57) ABSTRACT

A system and method executed by a computer server include determination that the computer server has lost network connectivity and, in response to the determination that the computer server has lost network connectivity, disabling of power to a volatile memory of the computer server. Determining that the computer server has lost network connectivity may include transmission of data to an external system and determination that a response to the data was not received from the external system. Disabling of power to the volatile memory may include transmission of a request to an operating system of the system to initiate a power-down sequence of the system.

20 Claims, 8 Drawing Sheets

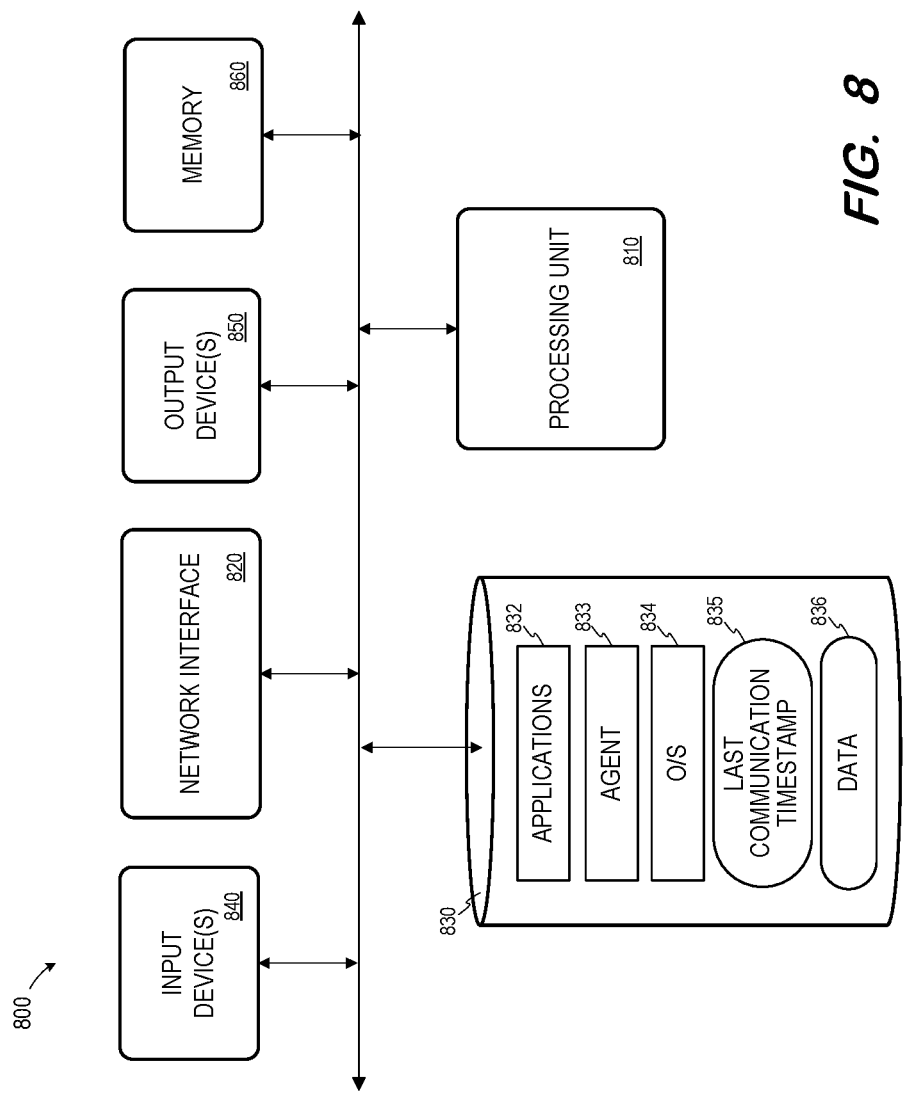

AUTONOMOUS SERVER PROTECTION SYSTEM

BACKGROUND

Modern computing systems employ many different security measures. For example, computer servers within a remote data center are protected via physical barriers (e.g., secure buildings, server rack cages), physical monitoring (e.g., cameras, motion detection) and software-based techniques (e.g., data encryption, malware detection, attack detection). In a data center including control plane servers and data plane servers, the control plane servers may monitor the data plane servers for suspicious activity and deploy measures to respond to such activity, such as initiating power down of a data plane server or revoking a security certificate associated with a data plane server.

The threat profile changes if the data plane servers and the control plane servers are not located in a same secure physical location. For example, communication between data plane servers and the control plane servers over the public internet is less secure than intra-location (e.g., direct-wired) communication. Moreover, measures deployed by control plane servers to respond to threats to data plane servers may be less robust than desired if the physical security of the data plane servers is suspect.

Systems are desired to provide increased security to computer servers, particularly with respect to remotely-managed computer servers.

BRIEF DESCRIPTION OF THE DRAWINGS

FIG. 8 is a block diagram of a computer server configured to autonomously power-down in response to network connectivity loss according to some embodiments.

DETAILED DESCRIPTION

The following description is provided to enable any person in the art to make and use the described embodiments. Various modifications, however, will remain readily-apparent to those in the art.

Some embodiments facilitate protection of a computer server. For example, a server according to some embodiments may operate to detect a loss of network connectivity and power itself down in response to the detection. Powering down is intended to transition the server into a state which resists theft or other unauthorized access to data stored in the server. For example, powering down the server may disable power to volatile memory of the server, thereby erasing its contents. Accordingly, an attacker is thereafter unable to access data which was stored in the volatile memory, or any data stored in non-volatile memory and which is accessible using the data which was stored in the volatile memory.

Some embodiments may provide particular benefits in cases where a computer server is managed by an external system such as a remote computer server. In typical operation, such a remote computer server may, as described above, detect suspicious activity based on data received from a managed computer server and, in response, transmit a signal to initiate a power-down sequence of the managed computer server. The present inventors have recognized that the ability to deploy these measures is limited or lost if the network connectivity between the managed computer server and the remote computer server is disabled. Moreover, the threat of disabled network connectivity increases if the managed computer server is not in the same physically-protected location as the remote computer server. According to some embodiments, the managed computer server addresses this threat by monitoring its own network connectivity and powering itself down in response to detecting a loss of network connectivity.

FIGS. 1A through 1E depict autonomous power-down of a computer server according to some embodiments. For purposes of the present description, a computer server may comprise a hardware device including at least one processor capable of executing software program code to cause the hardware device to operate as described herein. A computer server may exhibit any architecture and/or form factor that is or becomes known. In one non-exhaustive example, a computer server is a blade server comprising a plurality of multi-core processors and installed in a server rack along with a plurality of other blade servers.

Figure 1A:
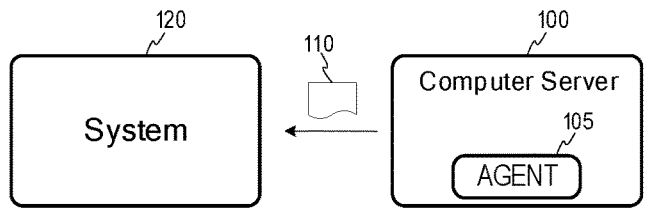
FIGS. 1A through 1E depict autonomous power-down of a server according to some embodiments.

FIG. 1A shows computer server 100 including agent 105. Agent 105 represents one or more components of computer server 100 which perform the inventive functions described herein. Agent 105 may comprise a software service executing on computer server 100, an operating system component, and/or any other combination of hardware and/or software.

Figure 1B:
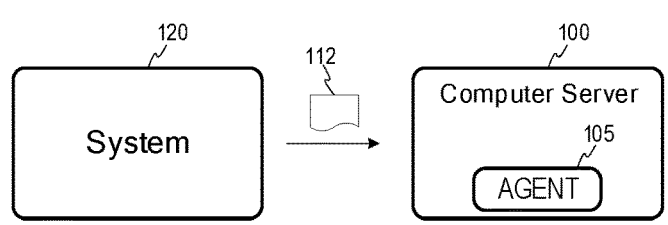
Figure 1C:
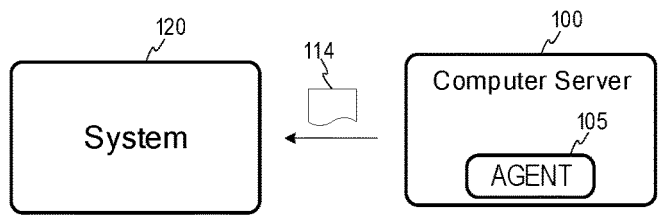

FIGS. 1A through 1E depict a process for autonomous power-down over time, such that the operation depicted in FIG. 1A occurs prior to the operation depicted in FIG. 1B, which occurs prior to the operation depicted in FIG. 1C, etc. Initially, as shown in FIG. 1A, computer server 100 executes agent 105 to cause transmission of data 110 to system 120. External system 120 may comprise any computing system accessible to computer server 100 over any one or more public and/or private networks and capable of receiving data 110 over the one or more public and/or private networks.

Data 110 may comprise any data suitable to elicit responsive data from external system 120. According to some embodiments, data 110 comprises an Internet Control Message Protocol (ICMP) message such as a traceroute message or an echo request message. Computer server 100 may transmit data 110 to system 120 specifically to determine whether network connectivity to system 120 has been lost, or may transmit data 110 for other purposes related to the operation of computer server 100, such as to acquire data requested by an application executing on computer server 100.

FIG. 1B illustrates transmission of responsive data 112 from system 120 to computer server 100. Responsive data 112 may comprise a responsive ICMP message such as an echo reply message or a response to a request from an application executing on computer server 100, but embodiments are not limited thereto. In response to reception of data 112, agent 105 determines that network connectivity between computer server 100 and system 120 exists.

After a predetermined or programmatically-determined time, agent 105 determines to again check the network connectivity between computer server 100 and system 120. FIG. 1C depicts transmission of data 114 intended to perform this check. Data 114 may be identical to data 112 or may comprise any other suitable data for eliciting a response from system 120.

Figure 1D:
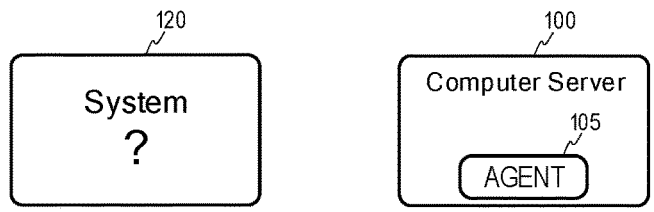

FIG. 1D indicates that no response from system 120 has been received by computer server 100. Accordingly, agent 105 determines that network connectivity to computer server 120 has been lost. This determination indicates that system 120 is down or otherwise unavailable (which may be extremely unlikely in some scenarios which provide significant redundancies) and/or that a network connection between computer server 100 and system 120 is compromised.

Figure 1E:
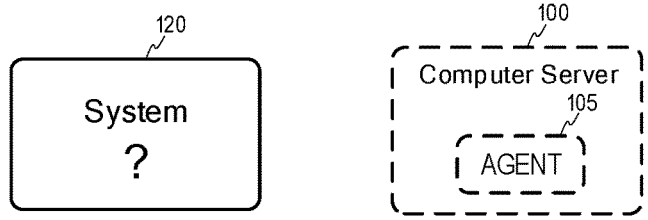

In response to the determination that network connectivity to computer system 120 has been lost, and as illustrated in FIG. 1E, agent 105 initiates a power-down sequence of computer server 100. This initiation may comprise sending a request to an operating system of computer server 100 to initiate a power-down sequence. Alternatively, and according to some embodiments, agent 105 may control a power supply unit of computer server 100 to cut off power to the other components of computer server 100 (i.e., akin to switching computer server 100 off). In some embodiments, "powering down" may describe any system to reduce power to the volatile memory of computer server 100 such that the volatile memory no longer retains its data.

By enabling computer server 100 to power itself down in response to a loss of network connectivity, some embodiments may efficiently resist unauthorized attempts to access data stored within computer server 100. Some embodiments may be particularly beneficial in scenarios where security measures for protecting a computer server from attack are at least partially provided by a remote computer server.

Figure 2:
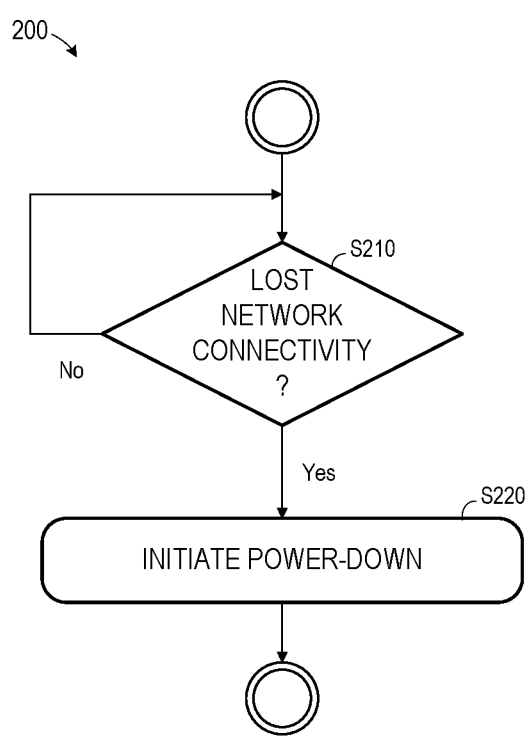
FIG. 2 is a flow diagram of a process to autonomously power-down a server according to some embodiments.

FIG. 2 comprises a flow diagram of process 200 to autonomously power-down a computer server according to some embodiments. In some embodiments, processing units (e.g., one or more processors, processing cores, processor threads) of a computer server execute software program code to perform process 200. Computer server 100 may execute program code of agent 105 to perform process 200, but embodiments are not limited thereto. Process 200 and all other processes mentioned herein may be embodied in processor-executable program code read from one or more of non-transitory computer-readable media, such as a volatile or non-volatile random access memory, a fixed disk drive, a DVD-ROM, a Flash drive, and a magnetic tape, and then stored in a compressed, uncompiled and/or encrypted format. Embodiments are therefore not limited to any specific combination of hardware and software.

At S210, a computer server executing process 200 monitors its network connectivity to determine whether network connectivity has been lost. Flow cycles at S210 as long as the network connectivity is determined to exist. Evaluation of network connectivity loss at S210 may occur periodically or continuously.

S210 may comprise determining whether the computer server is able to communicate at all over a computer network to which it is coupled (e.g., determining whether a computer network interface of the computer server is disabled), or determining whether the computer server is able to communicate with a particular one or more external servers. In the latter case, the one or more external servers may comprise one or more control plane servers which perform monitoring and management of the computer server.

The external server may be co-located with or remote from the computer server. The network connection between the external server and the computer server may include any one or more public and/or private networks. In some embodiments, the external server is located in a secure remote data center which is connected to the public internet, the computer server is located on client premises and is also connected to the public internet, and the external server and the computer server communicate via an encrypted tunnel.

Network connectivity may be monitored at S210 in any suitable manner that is or becomes known. In one example, S210 includes determining whether a network interface card of the computer server is receiving data. In another example of S210, the computer server periodically pings a known network device and determines a state of network connectivity based on a response of the network device.

S210 may comprise attempting to communicate directly with an external server using a communication protocol and network path over which the external server collects telemetry of and manages the computer server. For example, the computer server may periodically transmit an ICMP message to the external server to determine a state of network connectivity therewith.

Flow proceeds from S210 to S220 once the computer server determines that network connectivity has been lost. At S220, the computer server initiates a power-down sequence. S220 may comprise transmitting a request to an operating system of the computer server to initiate a power-down sequence controlled by the operating system. In some embodiments, the computer server may control its power supply unit (via the operating system or otherwise) to immediately power off rather than proceeding with the power-down sequence. Some embodiments of S220 may include controlling an external power supply which supplies power to the computer server to shut off power to the computer server. S220 may be performed in any suitable manner which results in erasure of the volatile memory of the computer server, according to some embodiments.

Figure 3:
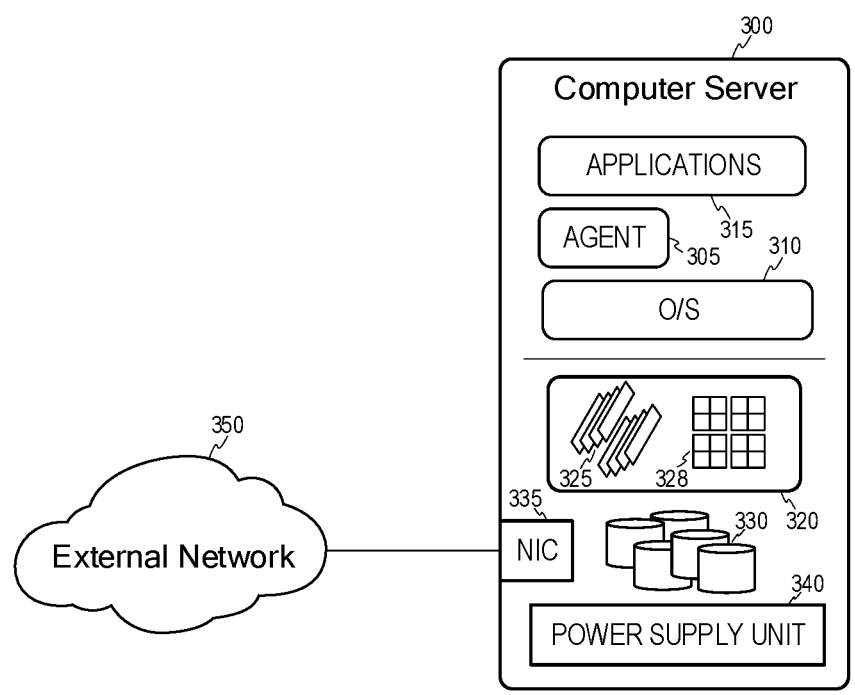
FIG. 3 is a block diagram of a computer server in communication with an external network according to some embodiments.

FIG. 3 illustrates computer server 300 and external network 350 according to some embodiments. Computer server 300 includes motherboard 320 supporting one or more volatile Random Access Memory (RAM) modules 325 and one or more Central Processing Units (CPUs) 328, one or more data storage devices 330 (e.g., hard and/or solid-state disk drives), network interface card 335 and power supply unit 340. Computer server 300 may comprise any types or combinations of server hardware that is or becomes known.

The components of computer server 300 may be located within a same physical chassis or multiple independent physical chassis. Computer server 300 may include other hardware and software required to execute the functions attributed to computer server 300 herein, as well as any other functions to be performed by computer server 300.

Computer server 300 also includes program code of agent 305, operating system 310 and applications 315. The program code may be stored in data storage devices 330 and loaded into RAM modules 325 for execution by CPUs 328. Applications 315 and agent 305 execute on operating system 310 to provide desired functionality using the hardware resources of computer server 300. Agent 305 may execute as a service and computer server 300 may also execute other services. Operating system 310 may communicate natively or with device drivers (not shown) associated with the various hardware resources.

External network 350 may comprise any number of public or private networks with which computer server 300 is intended to communicate. Under control of operating system 310, and responsive to instructions issued to operating system 310 by applications 315 and/or agent 305, network interface card 335 transmits data to and receives data from external network 350.

Computer server 300 may execute agent 305 to identify a loss of connectivity with network 350 and to initiate a power-down sequence of computer server 300 in response. According to some embodiments, computer server 300 may execute agent 305 to perform process 200. In some embodiments, the power-down sequence may include an instruction from operating system 310 to power supply unit 340 to disable power to motherboard 320.

Figure 4:
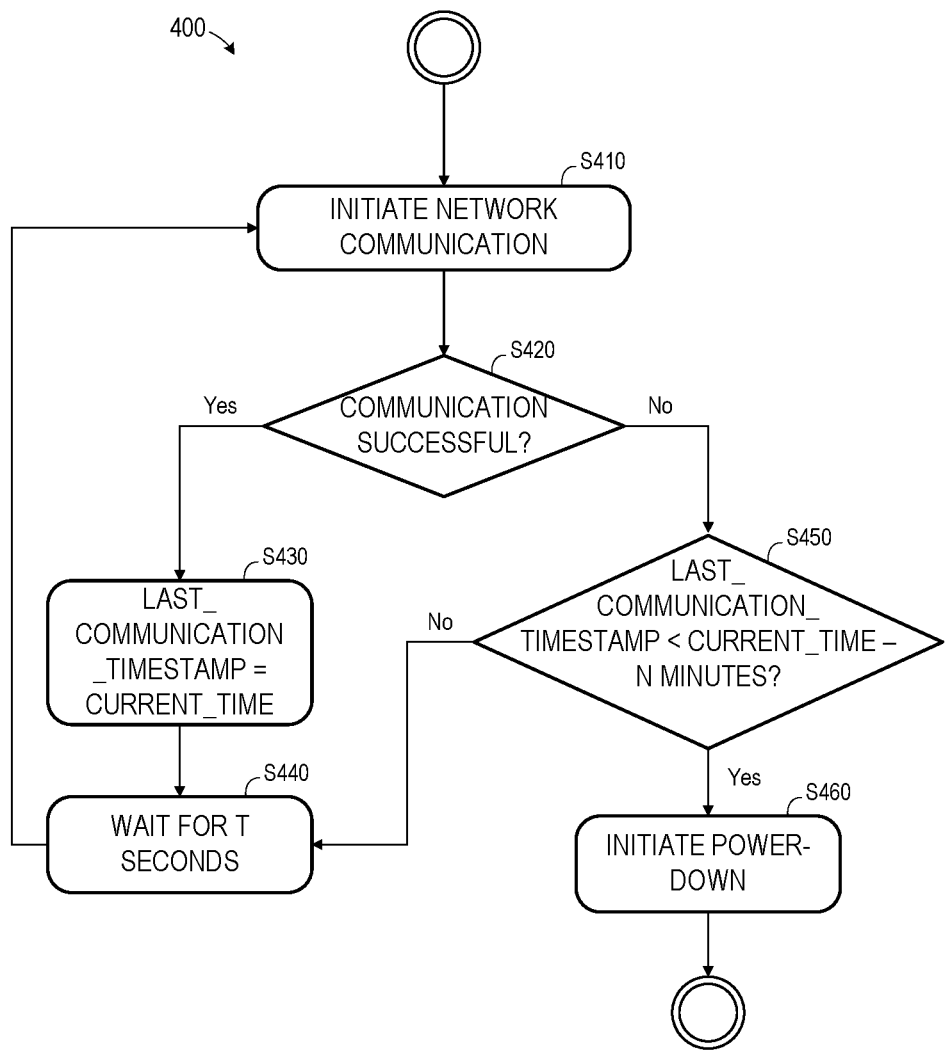
FIG. 4 is a flow diagram of a process to autonomously power-down a server in response to network connectivity loss according to some embodiments.

FIG. 4 is a flow diagram of process 400 to autonomously power-down a computer server in response to network connectivity loss according to some embodiments. Process 400 may comprise a specific implementation of process 200. Process 400 may be executed by a software agent executing as a service within a computer server but embodiments are not limited thereto.

Initially, at S410, a computer server initiates communication with an external computing system via a computer network. The other computing system may comprise a remotely-located monitoring and management computer server. The communication may be initiated at S410 exclusively to determine a state of network connectivity with the other computing system (e.g., a ping) or may be related to another function of the computer server (e.g., to communication telemetry data to the other computing system). The communication may be initiated by an agent executing on the computer server and which also performs the remaining steps of process 400 or by an application unrelated to the remaining steps of process 400.

S420 comprises a determination of whether the communication was successful. The determination may comprise determining whether an acknowledgement or other expected response was received within an expected timeframe. If so, flow proceeds to S430 to set a Last Communication timestamp to a current time. An agent executing process 400 may store the Last Communication timestamp in volatile or non-volatile memory of the computer server. Flow pauses at S440 for a time (e.g., 10 seconds) determined to suitably limit resource consumption of process 400 and flow then returns to S410. Accordingly, and assuming that network communication continues to be successful, the Last Communication timestamp is repeatedly updated to the current time as flow cycles through S410, S420, S430 and S440.

Flow proceeds from S420 to S450 once it is determined that an initiated communication was not successful, indicating a loss of network connectivity. At S450, it is determined whether the amount of time since a last successful communication with the external system exceeds a threshold time. For example, it may be determined whether an amount of time between the current Last Communication timestamp and the current time is greater than a specified number of minutes. If not, flow returns to S440 and continues as described above. Accordingly, the determination at S450 allows for brief losses in network connectivity without resulting in powering down of the computer server. The specified number of minutes (i.e., the duration of such brief losses) may be configurable based on security and performance considerations.

Flow proceeds from S450 to S460 if it is determined that an amount of time between the current Last Communication timestamp and the current time is greater than a specified number of minutes. At S460, power-down of the computer server is initiated, using any of the techniques described herein.

Figure 5:
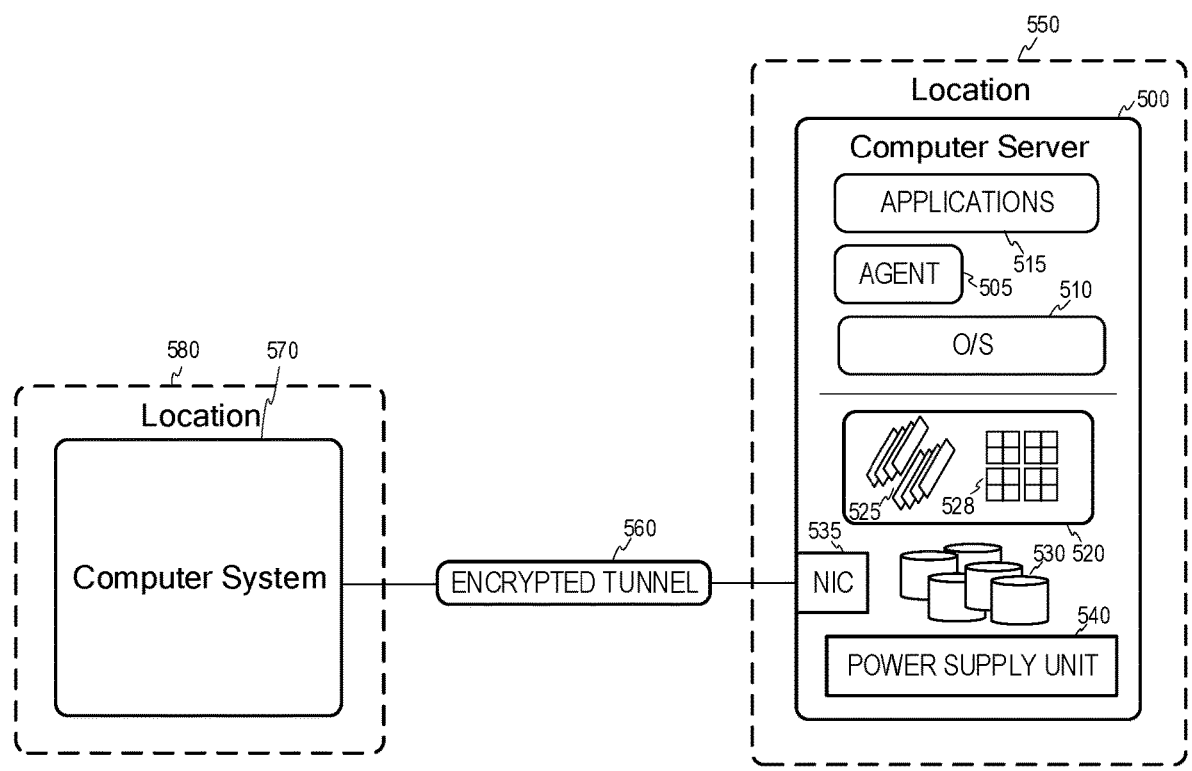
FIG. 5 is a block diagram of a computer server in communication with a computer system over an encrypted tunnel according to some embodiments.

FIG. 5 illustrates a system including computer server 500 and computer system 570. Computer system 570 may comprise any number of computer servers and other computing devices. Computer system 570 may provide management and monitoring of computer server 500 as is known in the art. Computer server 500 is located in location 550, which may be protected according to physical security protocols of a customer, while computer system 570 is located in location 580, which may be protected according to physical security protocols of a provider of computer system 570. For example, location 580 may comprise a data center owned and controlled by a cloud service provider, and location 550 may comprise a data center owned and controlled by a customer of the cloud service provider.

Locations 550 and 580 may be connected to one another via the public internet. To increase security of communications between locations 550 and 580, computer server 500 communicates with computer system 570 via encrypted tunnel 560. Encrypted tunnel 560 is established between computer server 500 and computer system 570 as is known in the art.

Computer server 500 may execute agent 535 to perform process 200, process 400, and any other process described herein. Generally, computer server 500 may execute agent 535 to detect a loss of connectivity with computer system 570 and to power-down in response to the detected loss. As will be described below, location 550 may include other instances of computer server 500, each of which is also in communication with computer system 570 via an encrypted tunnel and executes an agent to independently detect a loss of connectivity with computer system 570 and power itself down in response.

Figure 6:
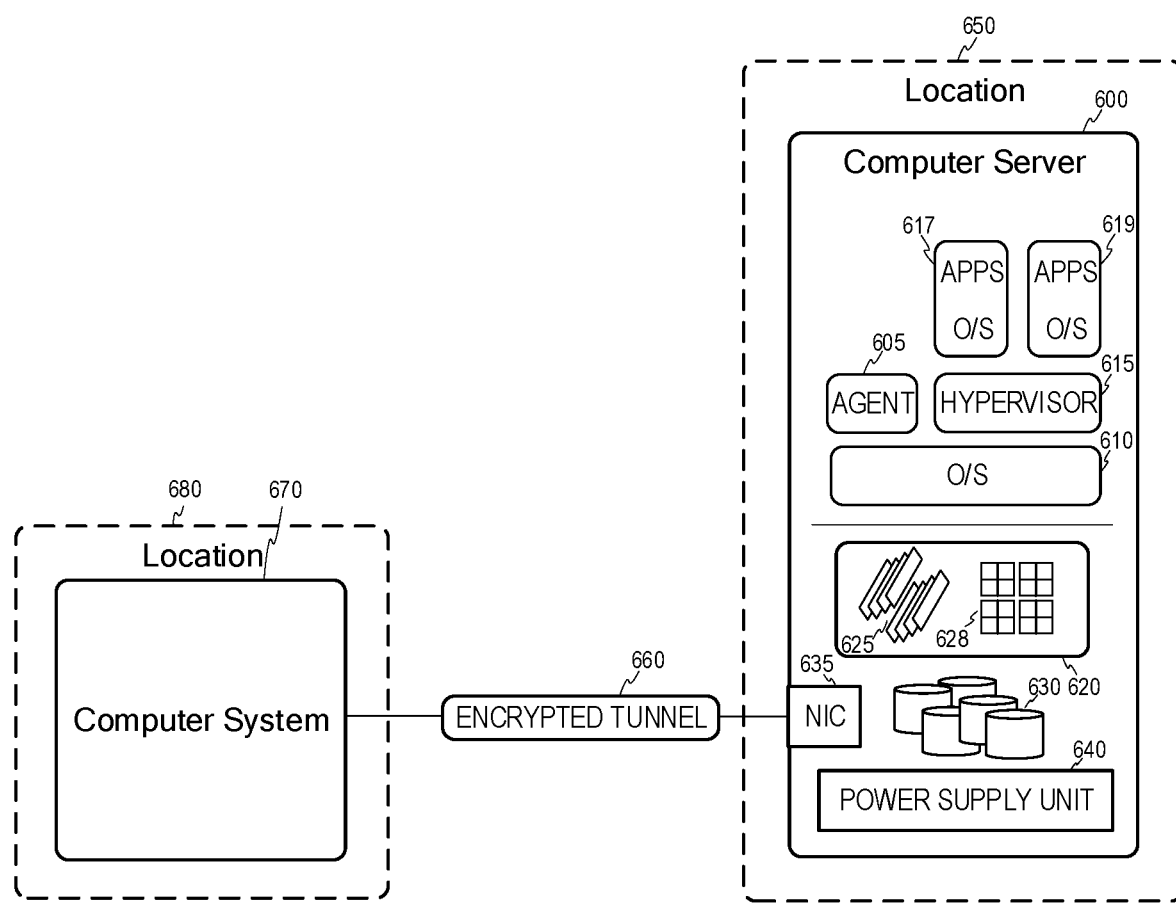
FIG. 6 is a block diagram of a computer server executing virtual machines and in communication with a computer system over an encrypted tunnel according to some embodiments.

FIG. 6 illustrates a scenario similar to FIG. 5 but in which computer system 670 creates and manages virtual machines within computer server 600. Computer system 670 may comprise any number of computer servers and other computing devices and may provide management and monitoring of computer server 600 as is known in the art. Location 680 may comprise a data center owned and controlled by a cloud service provider and location 650 may comprise a data center owned and controlled by a customer of the cloud service provider.

As is known in the art, computer system 670 instructs computer server 600 to allocate its physical hardware resources, such as RAM 625, CPUs 628 and storage devices 630, to one or more virtual machines, and assigns workloads to the virtual machines. In the illustrated example, computer system 670 has instructed computer server 600 to instantiate virtual machines 617 and 619, each of which is associated with dedicated sub-units of RAM 625, CPUs 628 and storage devices 630. Each of virtual machines 617 and 619 executes an operating system and applications using the physical resources allocated thereto, independent of other physical resources which are present on computer server 600.

Computer server 600 executes hypervisor 615 to manage virtual machines executing therein. For example, hypervisor 615 loads the operating systems of virtual machines 617 and 619 and allocates CPU resources, RAM, and disk storage space to each virtual machine 617 and 619 as instructed by computer system 670. Each virtual machine 617 and 619 then interacts with hypervisor 615 to utilize its allocated resources.

Hypervisor 615 may comprise a native hypervisor or a hosted hypervisor. A native hypervisor runs directly on host system hardware and does not execute on an underlying operating system. A native hypervisor therefore directly accesses the physical resources of the host system. A hosted hypervisor is installed on the underlying operating system of a host system. A hosted hypervisor therefore issues requests to the underlying operating system to access the physical resources of the host system.

Computer server 600 may execute agent 635 to detect a loss of connectivity with computer system 670 and to power-down in response to the detected loss. Location 650 may include other instances of computer server 600, each of which is also managed and controlled by computer system 670 to instantiate virtual machines and assign workloads thereto. Each of such instances may be in communication with computer system 670 via an encrypted tunnel and execute an agent to independently detect a loss of connectivity with computer system 670 and power itself down in response. Computer system 670 may deploy agent 635 to each instance of computer server 600 using known service deployment protocols.

Figure 7:
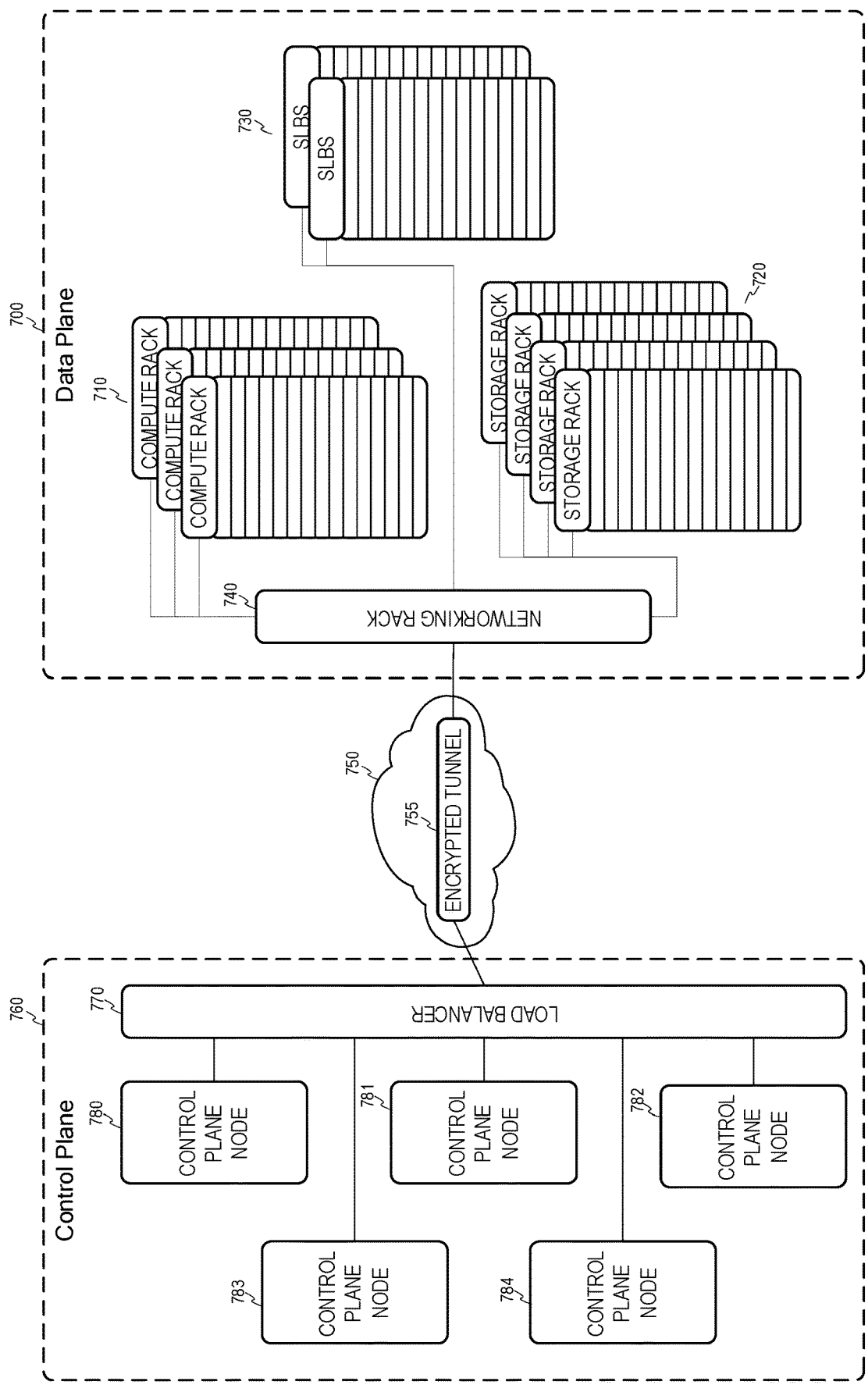
FIG. 7 is a block diagram of a data plane in communication with a control plane over an encrypted tunnel according to some embodiments.

FIG. 7 is a block diagram of data plane 700 and control plane 760 according to some embodiments. Control plane 760 may comprise any number of control plane nodes (e.g., computer servers) 780-784 and other computing devices, and may provide management and monitoring of data plane 700 as is known in the art. Control plane 760 may be located at data center owned and controlled by a cloud service provider.

Control plane 760 includes load balancer 770 in communication with each control plane node 780-784. Load balancer 770 distributes network traffic among control plane nodes 780-784 as is known in the art. Load balancer 770 communicates with networking rack 740 of data plane 700 over the public internet 750 via encrypted tunnel 755.

Data plane 700 may comprise a data center owned and controlled by a customer of the cloud service provider operating control plane 760. Data plane 700 includes several types of server racks, each containing one or more computer servers and supporting a type of workload. Each computer server of each server rack may be implemented by a computer server as described herein. Embodiments of data plane 700 are not limited to FIG. 7.

Each of compute racks 710 includes one or more computer servers providing execution of customer application workloads, and each of storage racks 720 includes one or more computer servers providing storage of customer data. Software load balancer racks 730 also include computer servers, which are intended to distribute network traffic among virtual machines of compute racks 710. Data plane 700 may include other computer servers providing other functionality. Each computer server of each of racks 710, 720 and 730 is in communication with networking rack 740. Each computer server of each of racks 710, 720 and 730 therefore communicates with control plane 760 through networking rack 740 and encrypted tunnel 755.

Control plane 760 may instruct any computer servers of data plane to allocate their physical resources to one or more virtual machines. Control plane 760 may then assign workloads to the one or more virtual machines as is known in the art. Control plane 760 may further de-allocate virtual machines and re-assign workloads as appropriate.

According to some embodiments, control plane 760 operates to deploy an agent to each computer server of each of racks 710, 720 and 730. Each computer server executes its agent to determine whether it is able to communicate with control plane 760 and, if not, to initiate a power-down sequence. Each agent may operate independently, such that if one agent of one computer server of racks 710, 720 and 730 detects a loss of network connectivity, the one computer server is powered down without affecting the power status any other computer server of data plane 700.

FIG. 8 is a block diagram of computer server 800 configured to autonomously power-down in response to network connectivity loss according to some embodiments. Server 800 may comprise a general-purpose computing apparatus and may execute program code to perform any of the functions described herein. Server 800 may comprise an implementation of any computer server described herein. Server 800 may include other unshown elements according to some embodiments.

Server 800 includes processing unit 810 operatively coupled to network interface 820, data storage device 830, one or more input devices 840, one or more output devices 850 and memory 860. Network interface 820 may facilitate communication with another computer system over a computer network as described above. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into server 800. Output device(s) 850 may comprise, for example, a display and a speaker.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM), Storage Class Memory (SCM) or any other fast-access memory. Data storage device 830 may be implemented using distributed storage systems.

Agent 833 may comprise program code executable by processing unit 810 to cause server 800 to perform any one or more of the processes described herein. In this regard, data storage device 830 stores Last Communication timestamp 835 to enable operation such as described with respect to process 400 of FIG. 4.

Storage device 830 further includes program code of applications 832 and operating system 834 as is known in the art. Data storage device 830 may also store data 836 other program code for providing additional functionality and/or which are necessary for operation of server 800, such as but not limited to program code of device drivers, program code of other services, and hypervisor program code.

Each functional component described herein may be implemented in computer hardware (integrated and/or discrete circuit components), in program code and/or in one or more computing systems executing such program code as is known in the art. Such a computing system may include one or more processing units which execute processor-executable program code stored in a memory system.

The above-described diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions.

Embodiments described herein are solely for the purpose of illustration. Those in the art will recognize other embodiments may be practiced with modifications and alterations to that described above.

What is claimed is:

1. A system comprising:
    a volatile memory storing processor-executable program code; and
    a processing unit to execute the processor-executable program code to:
        determine, at the system, that the system has lost network connectivity to an external system based on a network response time threshold being exceeded by:
            communicating telemetry data to an external system; and
            failing to receive an acknowledgment or response to the telemetry data within the network response time threshold;
        in response to the determination that the system has lost network connectivity, determine, at the system, to disable power to the volatile memory; and
        in response to the determination to disable power to the volatile memory, disable power to the volatile memory.

2. A system according to claim 1, wherein the telemetry data communicated to the external system is related to another function other than to determine a state of network connectivity of the system.

3. A system according to claim 2, wherein determining that the system has lost network connectivity further comprises:
    generating a last communication timestamp indicating when previous telemetry data was last acknowledged or responded to by an external system; and
    determining that the system has lost network connectivity if an amount of time exceeds the network response time threshold by comparing a current time after the telemetry data is communicated to the last communication timestamp.

4. A system according to claim 3, wherein determining that the system has lost network connectivity further comprises:
    determining that a first timeframe has expired based on not receiving the acknowledgment or response to the telemetry data, wherein the first timeframe begins upon sending the telemetry data to the external system; and
    based on the first timeframe expiring, comparing the current time after the telemetry data is communicated to the last communication timestamp to determine that that the network response time threshold has been exceeded, wherein the network response time threshold is larger than the first timeframe.

5. A system according to claim 3, further comprising an external power supply; and
    wherein disabling of power to the volatile memory comprises sending a command to the external power supply to shut off power to a computing device comprising the volatile memory.

6. A system according to claim 1, wherein the telemetry data communicated to the external system is different from pinging the external system.

7. A system according to claim 1, wherein the external system is a control plane to monitor the system connected via an encrypted tunnel.

8. A computer-implemented method for a computer server, comprising:
    determining, at the computer server, that the computer server has lost network connectivity to an external system based on a network response time threshold being exceeded by:
        communicating telemetry data to an external system, wherein the telemetry data communicated to the external system is related to another function other than to determine a state of network connectivity of the computer server; and
        failing to receive an acknowledgment or response to the telemetry data within the network response time threshold;
    determining, at the computer server, to power down the computer server in response to the determination that the computer server has lost network connectivity; and
    powering down the computer server in response to the determination to power down the computer server.

9. A method according to claim 8, wherein determining to power down the computer server in response to the determination that the computer server has lost network connectivity comprises:
    determining an initial loss of network connectivity based on a first timeframe expiring without receiving the acknowledgment or response to the telemetry data, wherein the first timeframe begins upon sending the telemetry data to the external system; and
    determining to power down the computer server only after the network response time threshold is exceeded, wherein the network response time threshold is larger than the first timeframe.

10. A method according to claim 9, wherein determining that the computer server has lost network connectivity further comprises:
    generating a last communication timestamp indicating when previous telemetry data was last acknowledged or responded to by an external system; and
    determining that the computer server has lost network connectivity if an amount of time exceeds the network response time threshold by comparing a current time after the telemetry data is communicated to the last communication timestamp.

11. A method according to claim 9, wherein the external system is a control plane to monitor the computer server.

12. A method according to claim 9, further comprises generating a last communication timestamp indicating when previous telemetry data was last acknowledged or responded to by external system.

13. A method according to claim 12, further comprises pausing for a predetermined time between generating the last communication timestamp and communicating the telemetry data to the external system.

14. A system comprising:
    a first plurality of computer servers located in a first data center, each of the first plurality of computer servers comprising a respective volatile memory and executing a respective software agent to:
  determine, at a first computing server of the first plurality of computer servers, that the first computing server has lost network connectivity based on a network response time threshold being exceeded by:
    communicating telemetry data to an external system; and
    failing to receive an acknowledgment or response to the telemetry data within the network response time threshold;
  in response to the determination that the first computing server has lost network connectivity, determine, at the first computing server, to disable power to a volatile memory of the first computing server; and
  in response to the determination to disable power to the volatile memory of the first computing server, disable power to the volatile memory of the first computing server to prevent unauthorized access to data stored on the volatile memory of the first computing server.

15. A system according to claim 14, wherein determining that the first computing server of the first plurality of computer servers has lost network connectivity comprises:
  transmitting the telemetry data from the first computing server comprising a data plane to a second plurality of computer servers comprising a control plane and located in a second data center; and
  determining that the acknowledgment or response to the telemetry data was not received from the second plurality of computer servers within the network response time threshold.

16. A system according to claim 15, wherein determining that the first computing server has lost network connectivity comprises:
  in response to the determination that the response to the telemetry data was not received, determining an amount of time since a last successful communication with the second plurality of computer servers based on a last communication timestamp that initiates when the first computing server last received a successful data transmission from the second plurality of computer servers; and
  determining that the first computing server has lost network connectivity if the amount of time exceeds a network response time threshold by comparing a current time to the last communication timestamp.

17. A system according to claim 15, wherein the second plurality of computer servers comprises a control plane to monitor the first plurality of computer servers and the telemetry data is sent via an encrypted communication tunnel between the first plurality of computer servers and the second plurality of computer servers.

18. A system according to claim 17, wherein disabling of power to the volatile memory of the first computing server comprises disabling power to the volatile memory of the first computing server without affecting a power status of other computer servers of the first plurality of computer servers.

19. A system according to claim 15, each of the first plurality of computer servers comprising a network interface coupled to a computer network,
  wherein determination that the first computing server has lost network connectivity comprises determination that a network interface of the first computing server is not receiving data from the second plurality of computer servers.

20. A system according to claim 15, wherein disabling the power to the volatile memory of the first computing server comprises sending a command to an external power supply to shut off power to a computing device comprising the volatile memory.

* * * * *